United States Patent [19]

Resnick

[11] Patent Number: 5,015,179

[45] Date of Patent: May 14, 1991

[54] SPEECH MONITOR

[76] Inventor: Joseph A. Resnick, R.D. 1, Box 415-A, Natrona Heights, Pa. 15065

[21] Appl. No.: 891,680

[22] Filed: Jul. 29, 1986

[51] Int. Cl.$^5$ .............................................. G09B 19/04
[52] U.S. Cl. ................................................... 434/185
[58] Field of Search .......................... 434/185; 381/48

[56] References Cited

U.S. PATENT DOCUMENTS

| | | | |
|---|---|---|---|
| 3,167,871 | 2/1965 | Brooks | 434/185 |
| 3,881,059 | 4/1975 | Stewart | 434/185 |
| 4,580,133 | 4/1986 | Matsuoka et al. | 381/48 |
| 4,641,343 | 2/1987 | Holland et al. | 434/185 |

Primary Examiner—William H. Grieb

[57] ABSTRACT

A method of speech training including sensing speech of a student and providing a digital indication of the sensed speech. Apparatus in support of this method is additionally provided.

6 Claims, 3 Drawing Sheets

SPEECH MONITOR

TECHNICAL FIELD

The present invention relates to a speech training and monitoring apparatus.

BACKGROUND OF INVENTION

Persons who cannot hear their own voice lack the feedback mechanism to correct errors in amplitude and consequently may speak too low or too high. A device for training such persons has been suggested by Cohen in U.S. Pat. No. 3,667,138. The Cohen device utilizes a light which varies in light intensity with speech amplitude.

DISCLOSURE OF INVENTION

It is an object of the invention to provide speech training method and apparatus requiring little, or no, assistance from an instructor.

This as well as other objects which will become apparent in the discussion which follows are achieved according to the invention by a method of speech training comprising sensing the speech of a student and providing a digital indication of the sensed speech. Apparatus in support of this method is additionally provided.

The digital indication of the present invention leaves no doubt as to how the student is performing, in contrast to the analog display of Cohen, where it is difficult to differentiate between light intensities and to remember what amount of light intensity corresponds to what performance.

MODES FOR CARRYING OUT THE INVENTION

Figure 1:
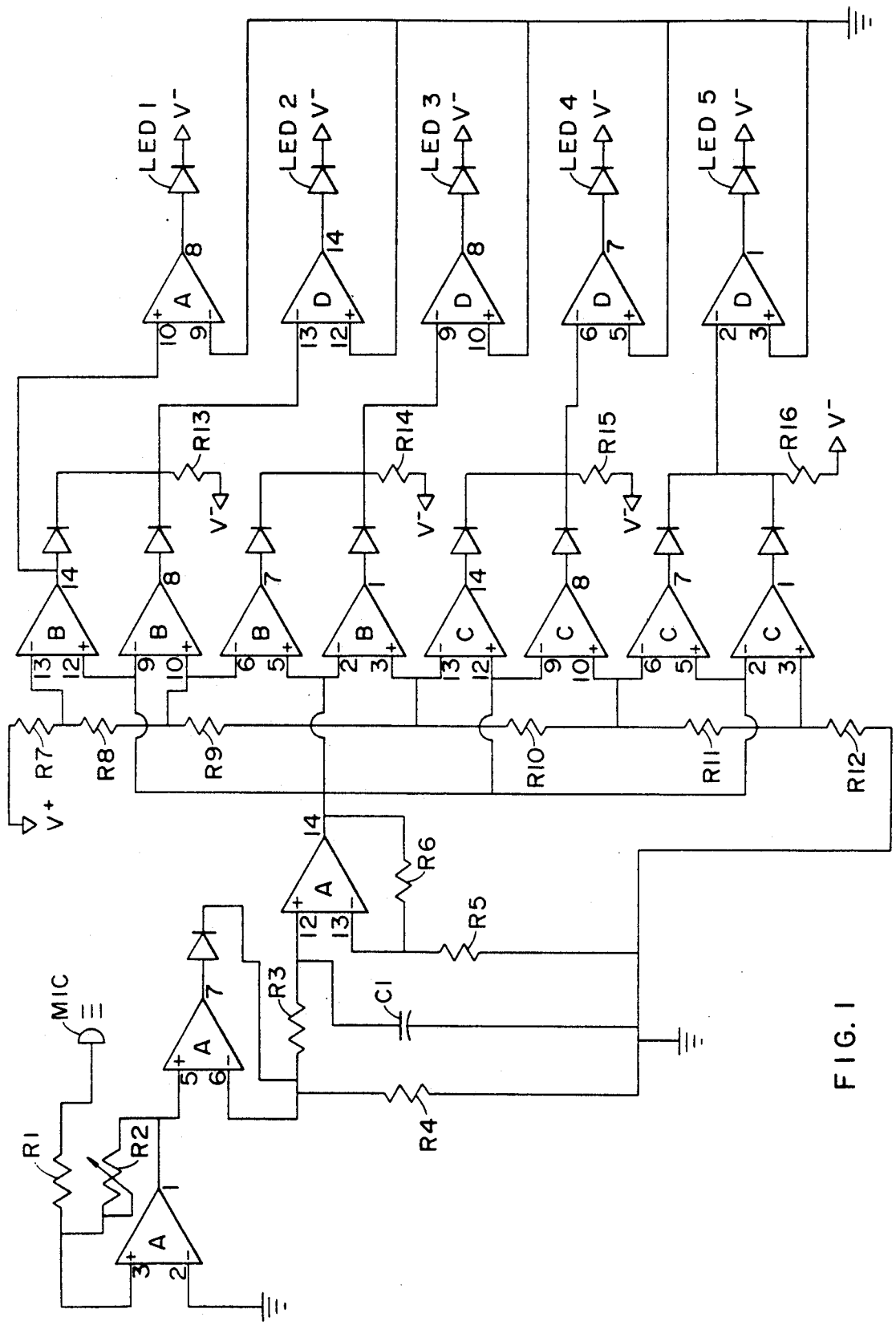
FIG. 1 is the schematic of an electrical circuit for apparatus useful in carrying out the invention.

An electronic circuit suitable for practicing the invention is shown in FIG. 1. It may be powered by batteries or by a power supply transforming an alternating current supply to the equivalent of power supplied by batteries. It may be combined with circuitry as mentioned in the above-cited patent of Cohen for discriminating against sound outside the range of 250 to 4000 Hertz to enable disregard of background noise. A similar effect of passing only the range 250 to 4000 Hertz is also available microphones and provided by the packaging of microphones.

The circuit of FIG. 1 has five lights. The high range of speech amplitude is indicated by illumination of LED 1, which may be red in color. Normal speech amplitude is indicated by illumination of LED 3, which may be green in color. Low speech amplitude is signaled by illumination of LED 5, which may be blue in color. Intermediate speech amplitude levels are indicated by illumination of LED 2 and LED 4, which may be yellow in color. The color of these lights can be established by colored glass covers over the LED's.

Overall sensitivity is adjustable at R2. In this circuit, the amplitude ranges are design parameters, because resistors R7 to R12 are fixed in resistance rather than variable. If R7 to R12 are variable resistors, the amplitude ranges can be adjusted too. Tables 1 and 2 describe the circuit components and performance of the FIG. 1 circuit.

TABLE 1

| Amplifiers A,B,C,D | Quad ICL 7642 (4 chips A,B,C,D) |
|---|---|
| LED's 1 to 5 | Low Current Light Emitting Diodes |
| V+, V− | Two - 1.2 Volt Batteries in Series |
| All Diodes | IN 914 |
| R1 | 10K ohms |
| R2 | 2M |
| R3 | 3M |
| R4 | 10M |
| R5 | 100K |
| R6 | 200K |
| R7 | 333.5K |
| R8 | 333.2K |
| R9 | 166.6K |
| R10 | 83.3K |
| R11 | 41.7K |
| R12 | 41.7K |
| R13 | 390K |
| R14 | 390K |
| R15 | 390K |
| R16 | 390K |
| C1 | 0.1 microfarads |
| MIC | Microphone |

TABLE 2

| Speech Amplitude | LED 5 (Low) | LED 3 (Normal) | LED 1 (High) |
|---|---|---|---|
| 0–30 decibels (dB) | ON | OFF | OFF |
| 60 dB | OFF | ON | OFF |
| 70+ dB | OFF | OFF | ON |

The filter to ground (R4, C1) reduces flicker of the lights and causes a generally smoother response to speech.

To explain the circuit of FIG. 1 in further detail, the first stage of amplifier A is a non-inverting amplifier providing a gain of 1+R2/R1.

The second stage of amplifier A is an active rectifier. Its purpose is to establish average voltage levels corresponding to average sound levels. Thus, the voice signal from the first stage is an alternating voltage whose average will always be zero.

The combination R3, C1 is a low path filter which averages the signal to prevent flicker. R4 allows C1 to discharge to establish an acceptable time constant for the averaging circuit R3, C1.

The third stage of amplifier A is a buffer to prevent loading of the circuit R3, C1 by the comparator bank comprising amplifiers B and C. The gain of this stage is 1+R6/R5.

Amplifiers B and C, with their associated resistors and diodes, form a comparator bank which has one, and only one, output low (which will turn-on one, and only one, LED) for any given voltage level.

The amplifiers 0 and amplifier A associated with the LED's are comparators which turn LED's on or off as required.

To explain the operation of the comparator bank (operational amplifiers B and C) and the comparators (D and the one A) switching the LED's, a typical section of the circuit, namely the section associated with LED's 3 and 4, will be explained.

The diodes act as switches: closed when forward biased, open when reverse biased.

The string of resistors R7 through R12 form a voltage divider providing voltages between 0 and V+ volts.

V3 is the voltage at the junction of R8 and R9, V2 at junction R9, R10, and V1 at R10, R11. Note that V3>V2>V1. The input voltage from pin 14 of A is V.

In Case 1, V2<V<V3.

Voltage at terminal B7<0; therefore associated diode is open.

Voltage at terminal 81<0; therefore associated diode is oPen.

Consequently, V⁻ is applied through R14 to terminal D9. (V⁻ is less than 0.)

Therefore, voltage at D8>0 and LED 3 is on (lights up).

Voltage at terminal C14>0; associated diode is closed.

Voltage at terminal C8<0; associated diode is open.

With the diode at terminal C14 closed, the voltage at terminal D6>0, and with ground voltage 0 being applied to terminal D8, terminal D7 has a voltage<0 and therefore LED 4 is off.

Summary for Case 1: LED 3 on; LED 4 off.

In Case 2, V1<V<V2.

Voltage at terminal B7<0; therefore associated diode is open.

Voltage at terminal B1>0; therefore voltage at D9>0; therefore voltage at D8<0; therefore LED 3 is off.

Voltage at C14<0; therefore associated diode open.

Voltage at C8<0; therefore associated diode open.

Therefore, V⁻ (negative) is applied through R15 to terminal D6. Therefore, voltage at terminal D7 is positive. Therefore, LED 4 is on.

Summary for Case 2: LED 3 off; LED 4 on.

The same reasoning applies to LED 2, 3, 4, 5.

The reasoning for LED 1 is simpler: When V is greater than the voltage junction of resistors R7 and R8, then VB14>0, VA10>0, VA8>0 and LED 1 is on. The diodes associated with terminals B]4, B7, C14 and C7 are closed (all others are off), keeping LED 2, 3, 4, 5 off.

The on-off nature of the indication of speech amplitude by the LED's provides a digital indication of speech performance, enabling clear determination in contrast to the analog display of Cohen.

Operation of the speech monitor as disclosed above is as follows:

(a) the amplitude ranges are set as a part of the circuit design (R7 to R12) or are adjustable by an instructor;

(b) an instructor sets the amplitude gain for the user (by R2 in FIG. 1);

(c) the user refers to the lights during speech without further recourse to an instructor.

The user of the device is able to visually monitor his or her speech amplitude with this device since more than one signal light is employed and the interpretation of the amplitude does not depend on an instructor.

Besides being useful for hard of hearing and/or deaf persons, the method and apparatus of the invention have applicability to other speech impaired persons, such as those with pitch disorders, vocal nodules, and inappropriate volume of speech (either too loud or too soft, such as seen in many Parkinson's and dysarthric patients).

Figure 2:
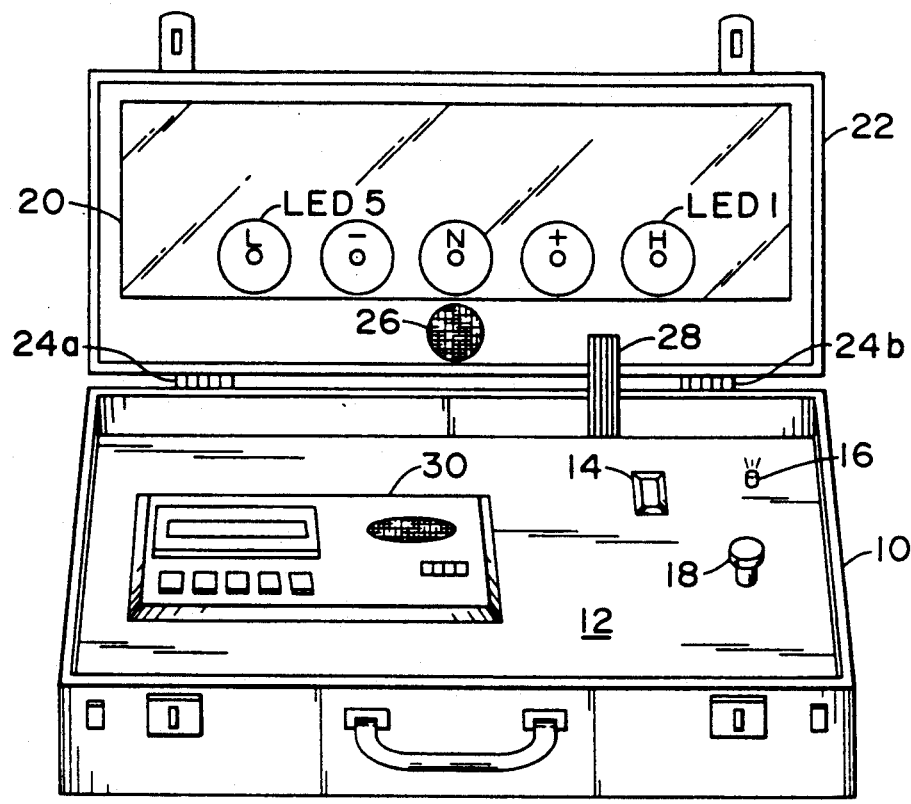
FIG. 2 shows a perspective view of a brief case embodiment of apparatus for the invention.

FIG. 2 shows a brief case embodiment of apparatus for the invention. Brief case base 10 contains a false floor 12, beneath which most of the components of the circuit of FIG. 1 are located. An on-off, push-button switch 14 and power "on" indicator light 16 (both not indicated in FIG. 1), are carried by the floor and, respectively, switch the batteries into, and out of, connection with the circuit and give a light indication of which condition exists at the moment. Rotary knob 18 is provided for adjusting R2.

Mounted on the inside of the lid of the brief case is a mirror 20. When the brief case is laid on a table and the lid 22 raised by rotation about hinges 24a and 24b, the user sitting in a chaIr is able to see his face reflected in the mirror. Mounted along the lower side of the mirror are the LED's 1 to 5 bearing designations "H", "+", "N", "−", and "L", respectively. Advantageously, the mirror and LED's are placed with respect to one another, and even with the LED's within the mirror as shown here, such that the user's peripheral vision includes the LED's, while central vision is observing facial movements in the mirror. This aids the learning process by providing simultaneous perception of both facial movements and amplitude signals. Use may also be the reverse, or vice versa, i.e. observation of an LED by central vision, with peripheral observation of the face.

The microphone 26 is also mounted in the lid. Flexible multi-wire bus 28 extends between the lid and the base of the brief case, to provide electrical connection between the parts of the circuit in the lid and those in the base. Additionally carried recessed in floor 12 is a tape recorder 30, such as a Realistic Compact Cassette Recorder Minisette-9 Model 14-812, DC 6V ("AA" Cell x 4), of Radio Shack, a division of Tandy Corporation. Means may optionally be provided for driving a tape recorder by appropriate transformation of an alternating current power supply.

In use, the apparatus of FIG. 2 is first adjusted by an instructor, by appropriate rotation of knob 18, until LED 3 lights for speech of normal amplitude. The tape recorder is also adjusted such that playback of recorded speech of normal amplitude also causes LED 3 to light.

Following adjustment, the student can practice speech exercises before the opened apparatus of FIG. 2. The apparatus helps to achieve improved phonation by providing a visual means for monitoring speech amplitude. The device provides visual feedback indicating under modulation, overmodulation, and appropriate dB levels through the use of the five LED's corresponding to desired dB levels, e.g. (from left to right in FIG. 2) 30 dB (undermodulation indicated by red colored LED at left-most location in the row), 60 dB (indicating desired, or normal ("N"), amplitude by green colored LED at midpoint in the row) and 70+ dB (indicated by red colored LED at right-most position in the row). Two yellow, or amber, colored LED's are placed between the 30 to 60 dB set points and 60 to 70 dB setpoints to indicate deviation of plus or minus 10% of the desired value. The subject's speech sounds are processed electronically and compared with the display which represents the desired speech tones. The user observes visually the device lights and the correct speech amplitude and recognizes same by visually monitoring the preset models (lights), while simultaneously watching the facial movements of the lips, and learning tongue positions, etc., by observation of his face in the mirror.

By placing the tape recorder in record mode while doing his exercises, the student can create a record of his efforts. Due to the earlier adjustment, when the teacher plays the tape recorder back, it will cause the same lighting of the LED's as observed by the student during the original practice session, and the teacher can work with the student on how to improve his performance.

Care must be taken, when adjusting and using the tape recorder, that it remains the same distance from the microphone, i.e. in its seat in floor 12, since variations in distance can create LED lightings other than what actually occurred in the student's use of the apparatus.

Figure 3:
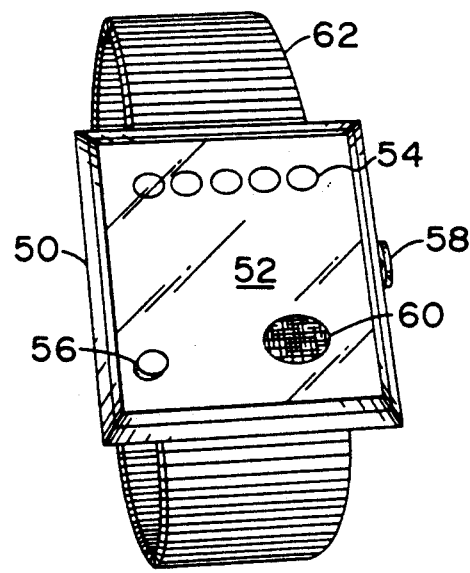
FIG. 3 is a perspective view of a wrist-carried embodiment of apparatus for the invention.

FIG. 3 shows a wrist-carried embodiment of the apparatus. This apparatus has a wrist watch design and contains within its case 50 a miniature, integrated circuit embodiment of the circuit of FIG. 1. The case has a cover 52 in the form of a mirror, which is preferably given an appropriate amount of curvature such that the student can observe sufficient facial area to see the formation of his speech. The LED's are arranged in a row 54 as in FIG. 2. Adjustment knob 56 corresponds to knob 18 in FIG. 2, while here a rotary on-off knob 58 serves the function of Push button 14 in FIG. 2. Microphone 60 senses the speech, as in FIGS. 1 and 2. Band 62 serves for holding the entire assemblage on the user's wrist. The amplitude of speech as discerned at the user's wrist is appropriate for use in monitoring the amplitude of user speech, since the distance from the wrist to the oral region can be maintained approximately constant.

Figure 4A:
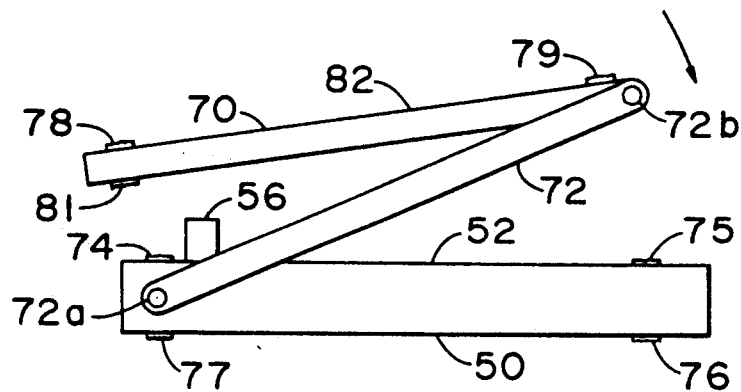
FIGS. 4A and 4B are schematic views onto the bottom edge of a case 50 as in FIG. 3, showing a mirror structure alternative to the placement in FIG. 3.
Figure 4B:
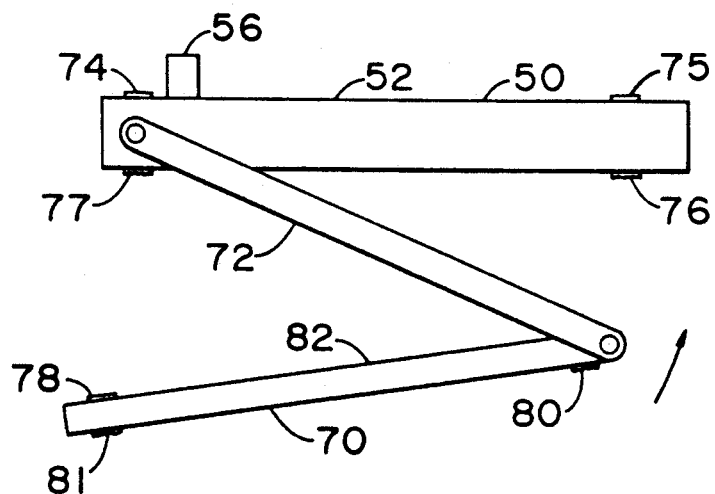

In FIGS. 4A and 4B, a mirror 70 is shown linked to case 50 by strut 72, with pivot connections 72a and 72b and a similar strut (not shown) behind strut 72 on the other side of the case. The case and mirror carry 8 strips, strips 74 to 81, of VELCRO interlocking-fiber fastener. In this case, cover 52 need not be a mirror, and the reflecting surface 82 may be swung into use position as in FIG. 4A or into storage position as in FIG. 4B. In use position, strip 81 is joined to strip 74 and strip 80 is joined to strip 75, while, in storage position, strip 77 is joined to strip 78 and strip 76 is joined to strip 79. In the storage position, the reflecting surface is stored away from the skin on the wrist of the wearer. Mirror 70 has appropriate cutouts providing access to LED row 54, knob 56, and microphone 60.

While the circuit of FIG. 1 is a preferred way of providing a digital indication of a student's sensed speech, circuits as shown in U.S. Pat. Nos. 3,615,162 and 4,319,081 may also be used.

I claim:

1. A method of speech training comprising sensing speech of a student and providing a digital display of the sensed speech, the display being in the form of spaced, on-off indicators, wherein the digital display is provided in conjunction with a view of the student's face.

2. A method as claimed in claim 1, the digital display being seen by peripheral vision while central vision is observing facial movements, or vice versa.

3. Apparatus for speech training comprising means for sensing speech of a student, means in the form of spaced, on-off indicators for providing a digital display of the sense speech, and means for providing the digital display in conjunction with a view of the student's face.

4. Apparatus as claimed in claim 3, the two means being mounted to a case adapted to be carried on a wrist, the view-providing means comprising a mirror means mounted to the case for positioning on a wrist-far side of the case in use and on a wrist-near side of the case in storage.

5. Apparatus as claimed in claim 4, the reflecting surface of the mirror being protected from the wrist when in storage.

6. Apparatus as claimed in claim 3, the two means placed such that one can be viewed by peripheral vision while the other is being observed by central vision.

* * * * *